(12) United States Patent
Preston et al.

(10) Patent No.: US 7,290,777 B2
(45) Date of Patent: Nov. 6, 2007

(54) CART FOR LOADING, TRANSPORTING AND STORING AN IMAGING MEDIA CARTRIDGE

(75) Inventors: Todd K. Preston, Greece, NY (US); Richard A. Kalb, Greece, NY (US); James J. Spence, Honeoye Falls, NY (US)

(73) Assignee: Xerox Corporation, Stamford, CT (US)

( * ) Notice: Subject to any disclaimer, the term of this patent is extended or adjusted under 35 U.S.C. 154(b) by 332 days.

(21) Appl. No.: 11/167,593

(22) Filed: Jun. 28, 2005

(65) Prior Publication Data

US 2006/0290085 A1    Dec. 28, 2006

(51) Int. Cl.
*B62B 1/00*    (2006.01)
*B60P 1/00*    (2006.01)
*A47B 57/00*   (2006.01)

(52) U.S. Cl. ............... 280/79.3; 280/47.34; 280/47.35; 280/47.41; 414/539; 414/540; 414/541; 414/628; 414/629; 414/930; 414/631; 414/632; 414/633; 414/679; 414/471; 414/477; 414/495; 211/187; 211/209; 211/190

(58) Field of Classification Search ............... 280/79.3, 280/47.34, 47.35, 47.41; 211/186, 187, 175, 211/209, 151, 153, 189, 190, 207, 162; 312/131–132, 312/198–201; 414/539–541, 628–633, 679, 414/471, 477, 495
See application file for complete search history.

(56) References Cited

U.S. PATENT DOCUMENTS

| | | | | |
|---|---|---|---|---|
| 5,622,470 A | * | 4/1997 | Schaefer et al. | ............ 414/807 |
| 6,102,647 A | * | 8/2000 | Yap | ............................ 414/539 |
| 6,394,743 B1 | * | 5/2002 | Marsden et al. | ............ 414/809 |

* cited by examiner

*Primary Examiner*—Christopher P. Ellis
*Assistant Examiner*—John R. Olszewski
(74) *Attorney, Agent, or Firm*—Oliff & Berridge, PLC

(57) ABSTRACT

A transportable device, such as a cart, for transporting and elevating an imaging media cartridge into a press printer may include a base platform, first and second elevation members disposed thereon, a panel disposed between the first and second elevation members, and first and second elevator platforms. The panel may include a pair of opposite vertical faces along which the elevator platforms slide to mutually exchange elevations by vertically sliding the platforms in opposite directions. The device may be used for a method of transporting and elevating an imaging media cartridge into a press printer at an installation height above a floor. Additionally, the device may be used for a method of removing and storing an imaging media cartridge from a press printer at an installation height above the floor.

12 Claims, 9 Drawing Sheets

CART FOR LOADING, TRANSPORTING AND STORING AN IMAGING MEDIA CARTRIDGE

BACKGROUND

This invention relates to a transportable device for installing, retrieving, moving and storing an imaging media cartridge that is otherwise non-ergonomically mounted.

A production-level high-end printer, such as the iGen printing press, may include a customer changeable unit (CCU) to supply and/or develop imaging media corresponding to a customized color. Such imaging media may include dry toner or liquid ink. The CCU may include, for example, an imaging media dispenser as well as a developer, particularly for a toner and integrated together in an imaging media cartridge.

The imaging media may correspond to a standard set of colors that include cyan, magenta, yellow and black (CMYK) in the four standard imaging media stations may be augmented by a trademarked color heavily used by a printer client for high quality publications.

Such trademarked colors may be assigned a corresponding four-digit PANTONE® number and assigned to a fifth imaging media station. Upon completion of a print run for one printer client using a first CCU having imaging media in a first trademarked color, the first CCU may be removed and replaced by a second CCU having imaging media in a second trademarked color for another printer client. Alternatively, the CCU in the fifth imaging media station may be assigned to a heavily used color of the CMYK set.

The CCU may be integrally designed and constructed, and can weigh between ~30 and ~40 pounds-mass. Due to the limited volume of the press and the constrained floor space of a typical printing shop, the CCU may be installed into a right side Xerographic-tower (or X-tower) of the iGen printing press at a mounting position that can be difficult to reach, such as positions above the level permitted by government regulation or personnel contract.

SUMMARY

Various exemplary embodiments provide a transportable device, such as a cart, for transporting and elevating an imaging media cartridge into a press printer may include a base platform, first and second elevation members disposed thereon, a panel disposed between the first and second elevation members, and first and second elevator platforms. The panel may include a pair of opposite vertical faces along which the elevator platforms slide to mutually exchange elevations by vertically sliding the platforms in opposite directions.

In various exemplary embodiments, the device may include a docking mechanism to connect to the press printer, a pulley that connects to and counterbalances the first and second elevator platforms, a horizontal guide rail on the first and second elevator platforms, caster wheels disposed on the base platform for translating and rotating the device along the floor, and/or a reinforcement frame between the base platform and the first and second elevation members.

In various exemplary embodiments, the device may be used for a method of transporting and elevating an imaging media cartridge into a press printer at an installation height above a floor. Additionally, the device may be used for a method of removing and storing an imaging media cartridge from a press printer at an installation height above the floor.

BRIEF DESCRIPTION OF THE DRAWINGS

Various details are described below with reference to the following figures, wherein.

DETAILED DESCRIPTION OF EMBODIMENTS

The following detailed description refers to a transport and installation device for print imaging media cartridges. The device may refer to a cart that interfaces with the iGen printing press, for example. However, it should be appreciated that the principles described herein may be equally applied to any known or later-developed imaging media cartridge carts, beyond the examples specifically discussed herein.

Figure 1:
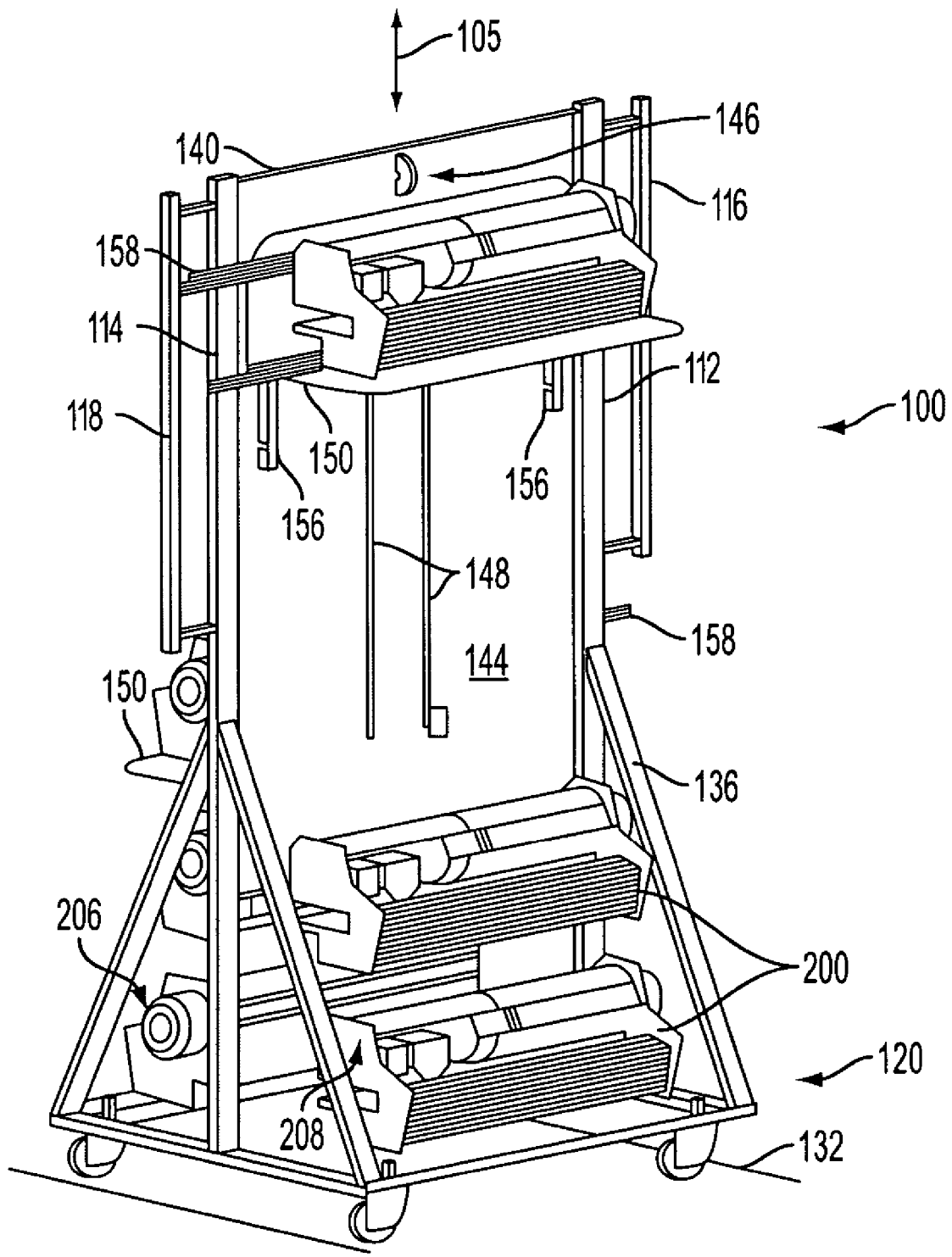
FIG. 1 shows an isometric view of an exemplary cart for moving and mounting a customer changeable unit.
Figure 2:
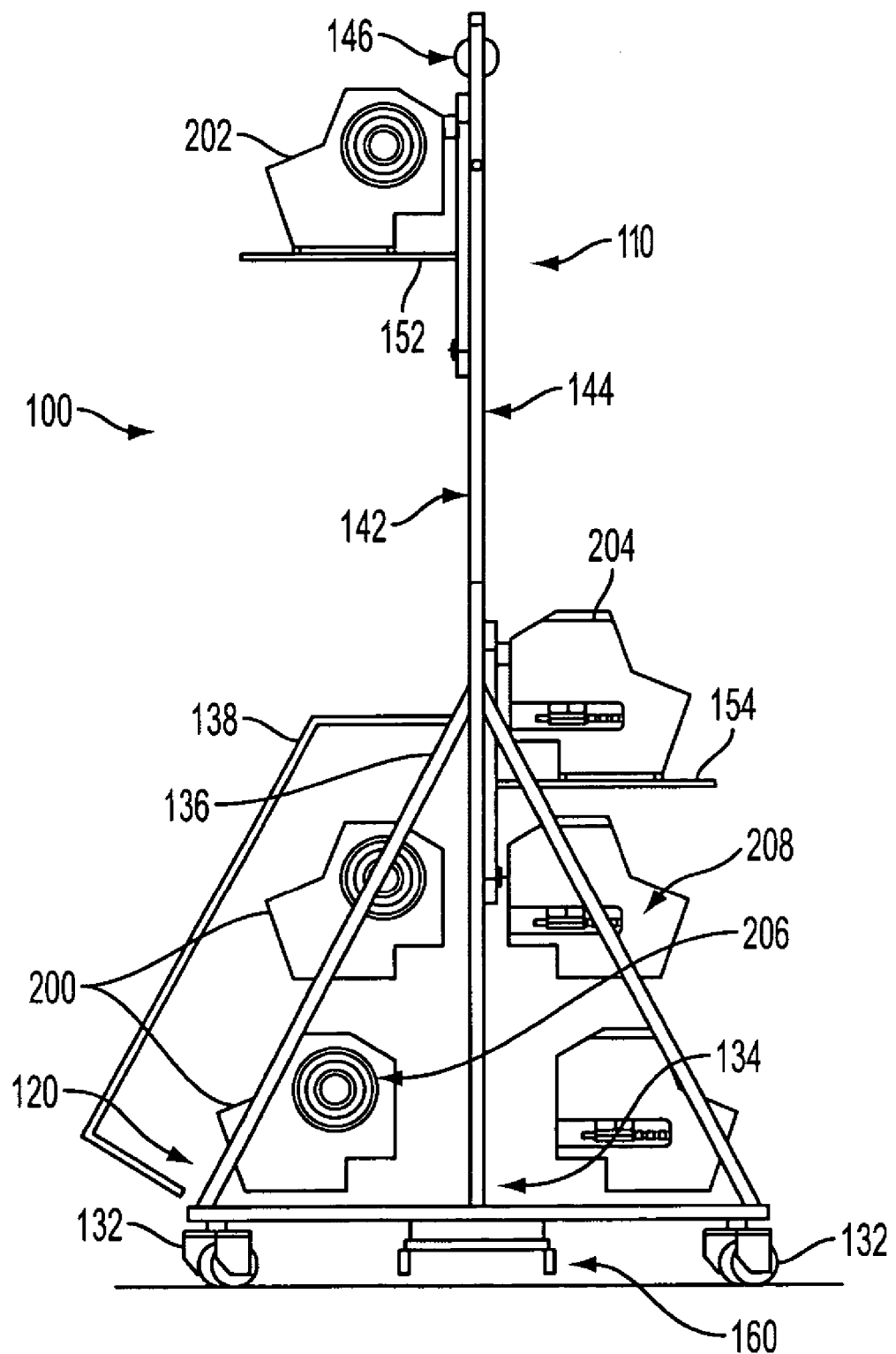
FIG. 2 shows an elevation view of the cart.
Figure 3:
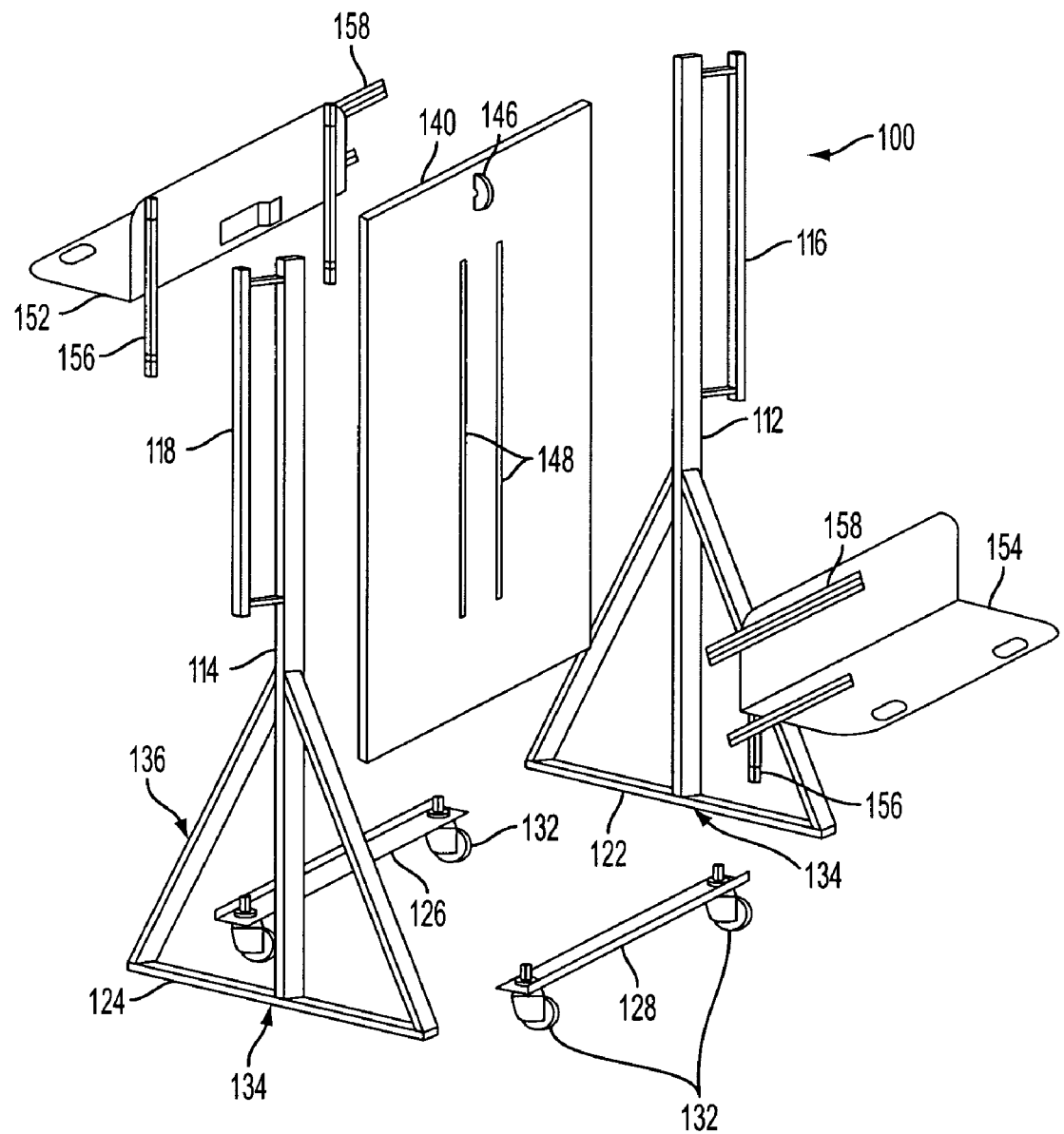
FIG. 3 shows an exploded view of the cart.

FIGS. 1-3 show isometric, elevation and exploded views, respectively, of a cart 100 associated with several CCUs 200, according to an exemplary embodiment. The cart 100 may be constructed of mild steel in a tubular frame structure, although alternate structural forms can be envisioned by artisans skilled in the art.

The cart 100 includes a vertical frame 110 that may be quadrilaterally symmetrical about a vertical axis 105. The vertical frame 110 is shown to include a fore vertical (or elevation) member 112 and an aft vertical member 114. Fore and aft docking handle bars 116, 118 may be disposed on the respective vertical members 112, 114 to interface against the X-tower of the iGen press.

A base platform 120 may be disposed on the cart 100 at the bottom of the vertical frame 110. The base platform 120 may include fore and aft base members 122, 124, connected at perpendicular joints to obverse and reverse crossbar members 126, 128. Casters 132 may be suspended from the crossbar members 126, 128 to enable the cart 100 to be rolled along on a floor surface, except when releasably locked into a stationary position.

The fore and aft base members 122, 124 may connect with their counterpart fore and aft vertical members 112, 114 to form respective perpendicular T-joints 134. The base platform 120 may include docking latches 160 at the fore and aft base members 122, 124. The docking latch 160 enables the cart 100 to be releasably secured to the X-tower of the iGen press.

An A-frame 136 may extend upward from the base platform 120 to join with the vertical frame 110 on the fore and aft vertical members 112, 114. The A-frame 136 may include multiple racks to permit storage of one or more CCUs 200. The racks may include one or more rods from which a CCU 200 may be hung or suspended by hooks, ledges and/or other attachment mechanisms. While hung from the racks of the A-frame 136, the CCUs 200 may be covered by an environmental enclosure 138 to inhibit contamination or damage during transport or storage. The A-frame 136 may reinforce T-joints 134 between the base platform 120 and the vertical frame 110 against shear stress, but alternatively, the A-frame 136 may be omitted as optional.

A vertical panel 140 may be disposed between the fore and aft members 112, 114, extending from near the top of the A-frame 136 to the top of the vertical frame 110. The panel 140 may provide obverse and reverse faces 142, 144, respectively. A pulley wheel 146 may be disposed between the obverse and reverse faces 142, 144 to raise or lower the CCUs 200 along a pair of vertically running parallel slots 148 that may be disposed through the panel 140.

Elevator platforms 150 may be suspended from the panel 140. The platforms 150 include obverse and reverse platforms 152, 154 that may be counterbalanced on the respective obverse and reverse faces 142, 144 of the platform 140. The obverse and reverse platforms 152, 154 may be connected to each other by the pulley wheel 146 to translate vertically along the slots 148 for their respective raising and lowering so as to mutually exchange their respective elevations. The obverse and reverse platforms 152, 154 may include vertical brackets 156 disposed along the respective obverse and reverse faces 142, 144 of the panel 140. A portion of the obverse and reverse platforms 152, 154 may protrude through one of the vertically running parallel slots 148 to facilitate sliding. The obverse and reverse platforms 152, 154 may each include a horizontal guide rail 158 along which a CCU 200 can slide.

A replacement CCU 202, to be installed, can be placed on the obverse platform 152, while a retrieved CCU 204 can be placed on the reverse platform. 154. The CCUs 200 include front and rear ends, with the front end 206 shown for the replacement CCU 202 on the obverse platform 152 and the rear end 208 shown for the retrieved CCU 204 on the reverse platform 154. FIG. 2 shows the reverse platform 154 with the retrieved CCU 204 at a load position that represents a person's lift height of 30 inches from the floor. The obverse platform 152 with the replacement CCU 202 is shown at the mounting height of 63 inches above the floor.

Figure 4:
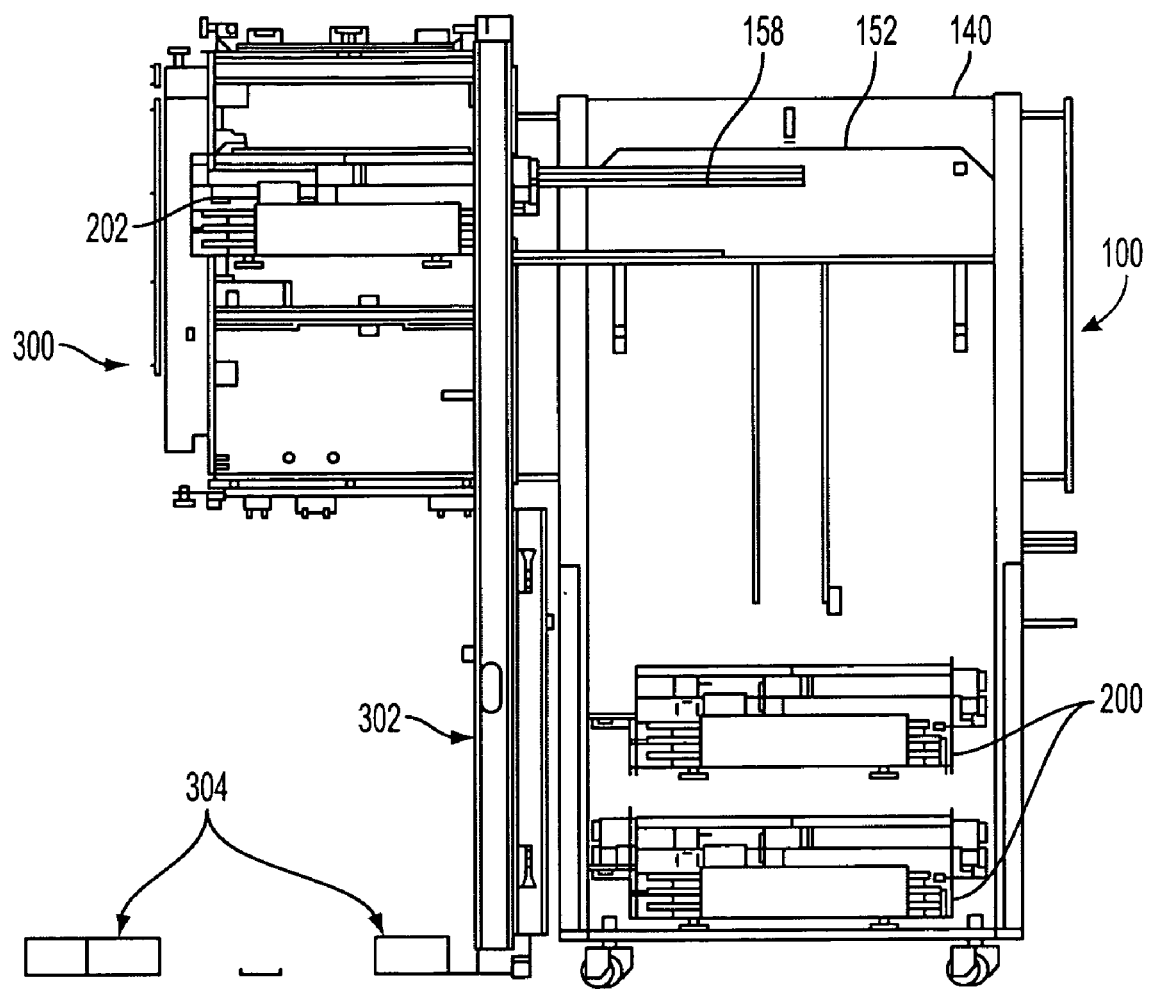
FIG. 4 shows a plan view of the cart and an X-tower with which the cart interfaces.
Figure 5:
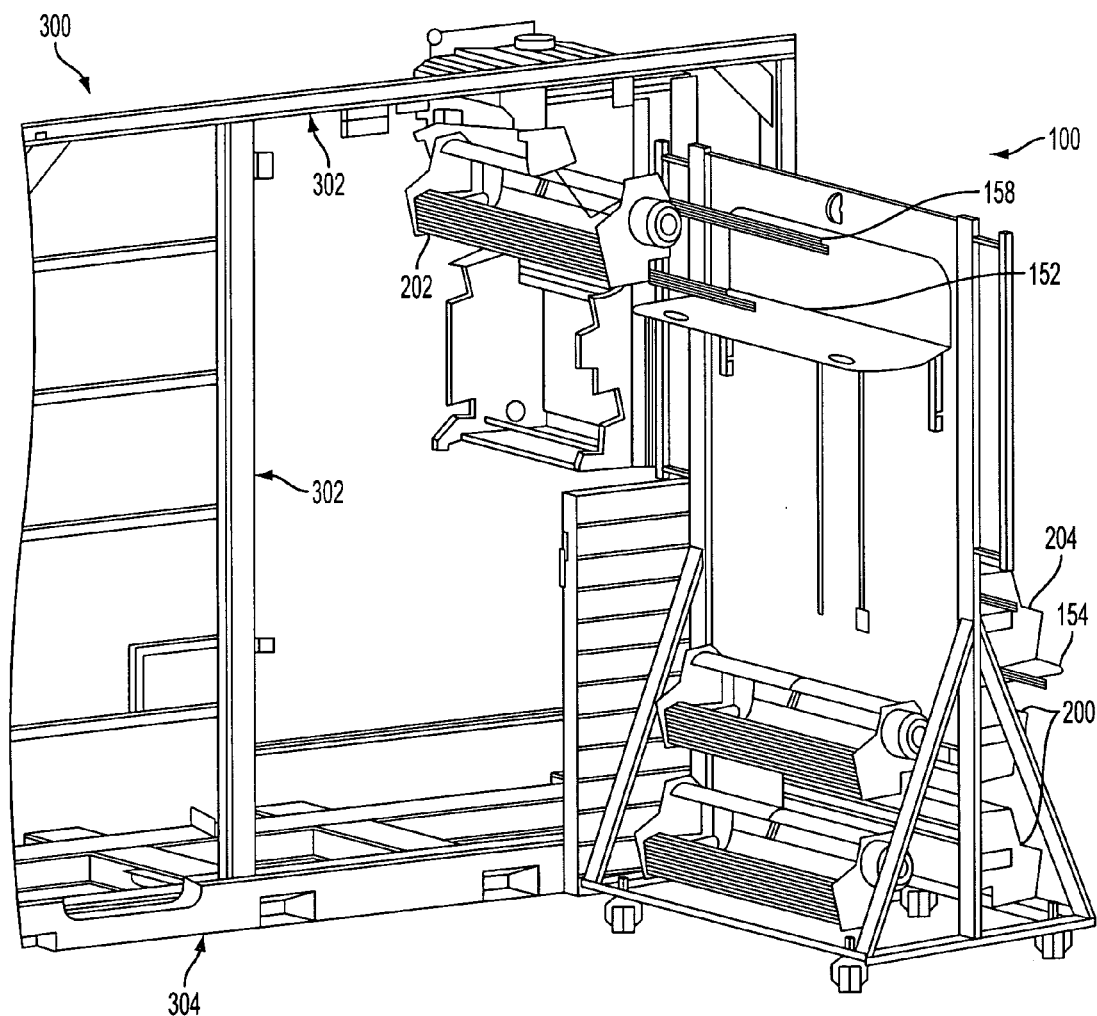
FIG. 5 shows an isometric view of the cart and the X-tower.

FIGS. 4 and 5 show plan and isometric views of the cart 100 in cooperation with an iGen X-tower 300 with its front side exhibited as a tower frame 302. The X-tower 300 has approximate dimensions of ~8 feet tall, ~4 feet deep and ~10 feet long. A tower base 304 at the bottom of the X-tower includes a docking port to receive the docking latch 160 of the cart 100. The interface of the docking latch 160 and the docking port enables the cart 100 to be securely and detachably locked into position adjacent to the X-tower 300, with one of the handle bars 116, 118 disposed along the front side and the casters 132 locked.

FIGS. 6-11 show views of an exemplary embodiment of the docking mechanisms for the cart 100 and the X-tower 300. Those of ordinary skill in the art will recognize that these descriptions are provided for illustration only and are not intended to be limiting.

Figure 6:
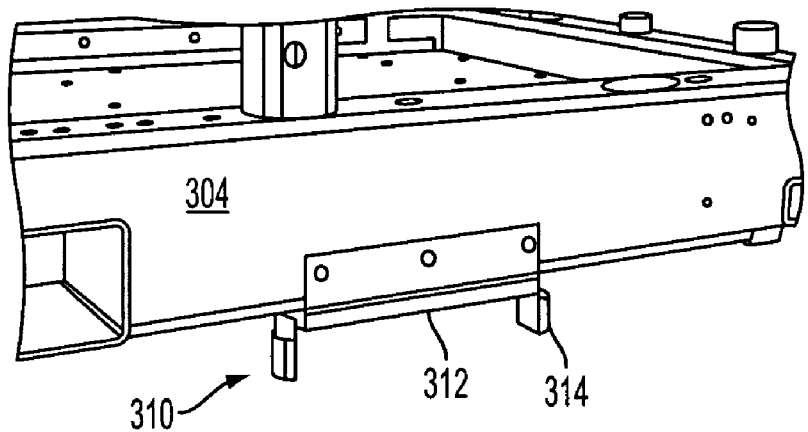
FIG. 6 shows an isometric view of docking mechanism for the X-tower.

FIG. 6 shows an isometric view of a docking port 310 the tower base 304 at the bottom of the X-tower. The docking port 310 includes a mounting plate 312 flanked by a pair of retaining springs 314 to receive the docking latch 160.

Figure 7:
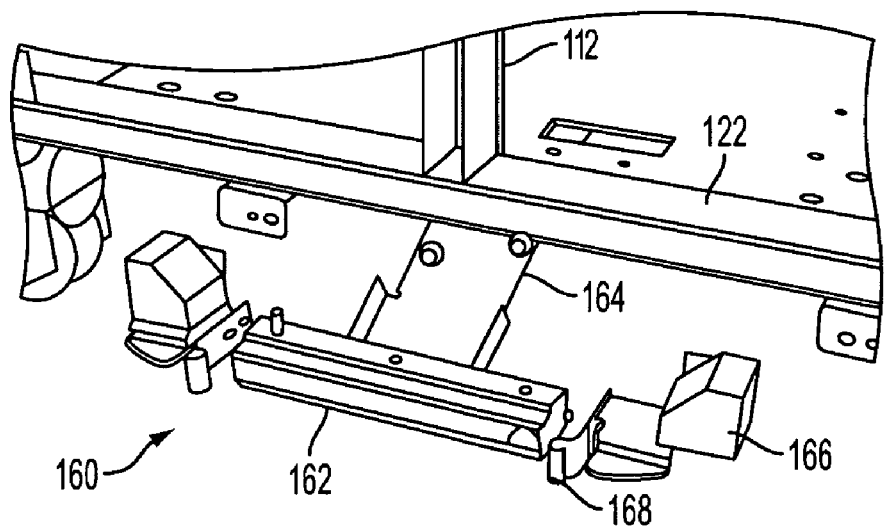
FIG. 7 shows an isometric view of docking mechanism for the cart.

FIG. 7 shows an isometric view of the docking latch 160 in detail for the fore side of the cart 100. The docking latch 160 may include an insert 162 extending beyond the fore base member 122 and connected to a tongue 164 extending from under the base platform 120. The insert 162 may be flanked by a pair of bumpers 166 and associated cart springs 168. The insert 162 may engage the mounting plate 312 as the cart springs 168 connect against their corresponding retaining springs 314.

Figure 8:
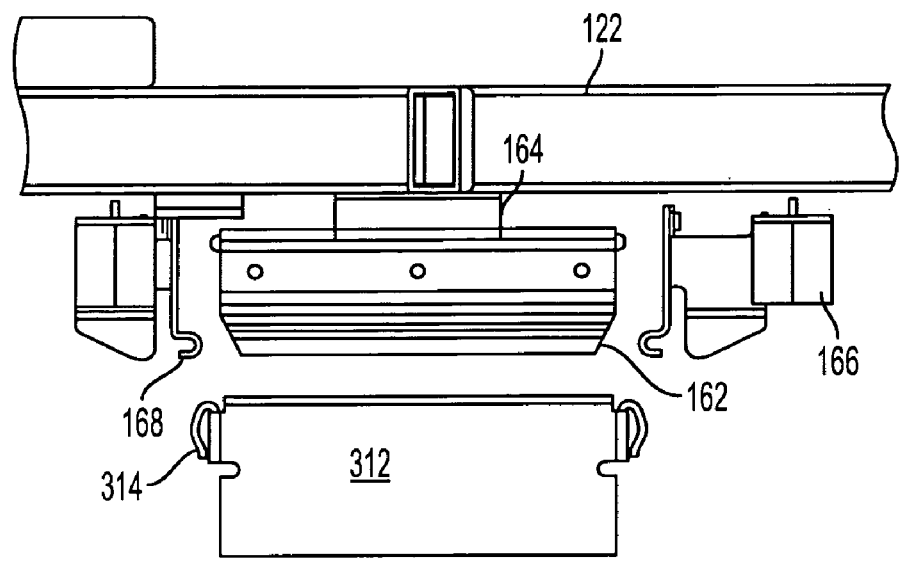
FIGS. 8 and 9 show plan views of the docking mechanisms for the cart and the X-tower in approach and docking modes, respectively.
Figure 9:
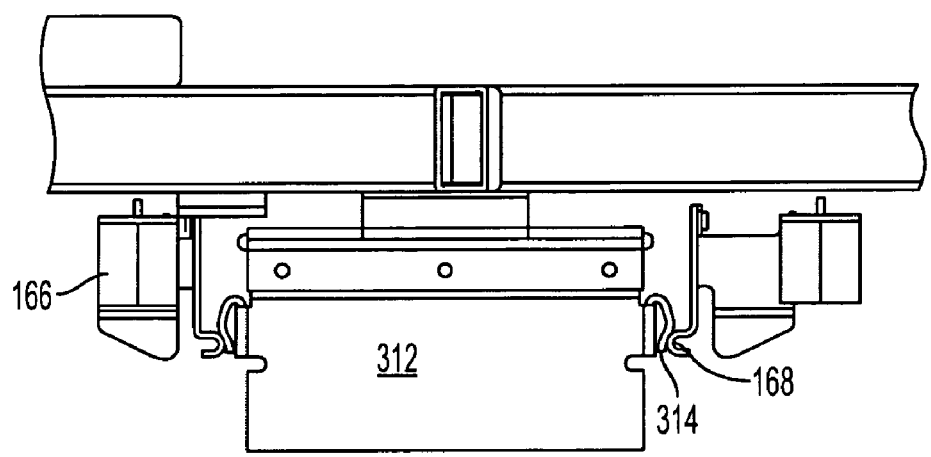

FIGS. 8 and 9 show plan views, for respective approach and docking configurations, of the tower base 304 and the components of the docking latch 160. The insert 162 may be aligned with the mounting plate 312 during approach. As the insert 162 slides underneath the mounting plate 312, the cart springs 168 engage their counterpart retaining springs 314 to secure the cart 100 to the X-tower 300, while the bumpers 166 attenuate vibrations resulting from component interaction.

Figure 10:
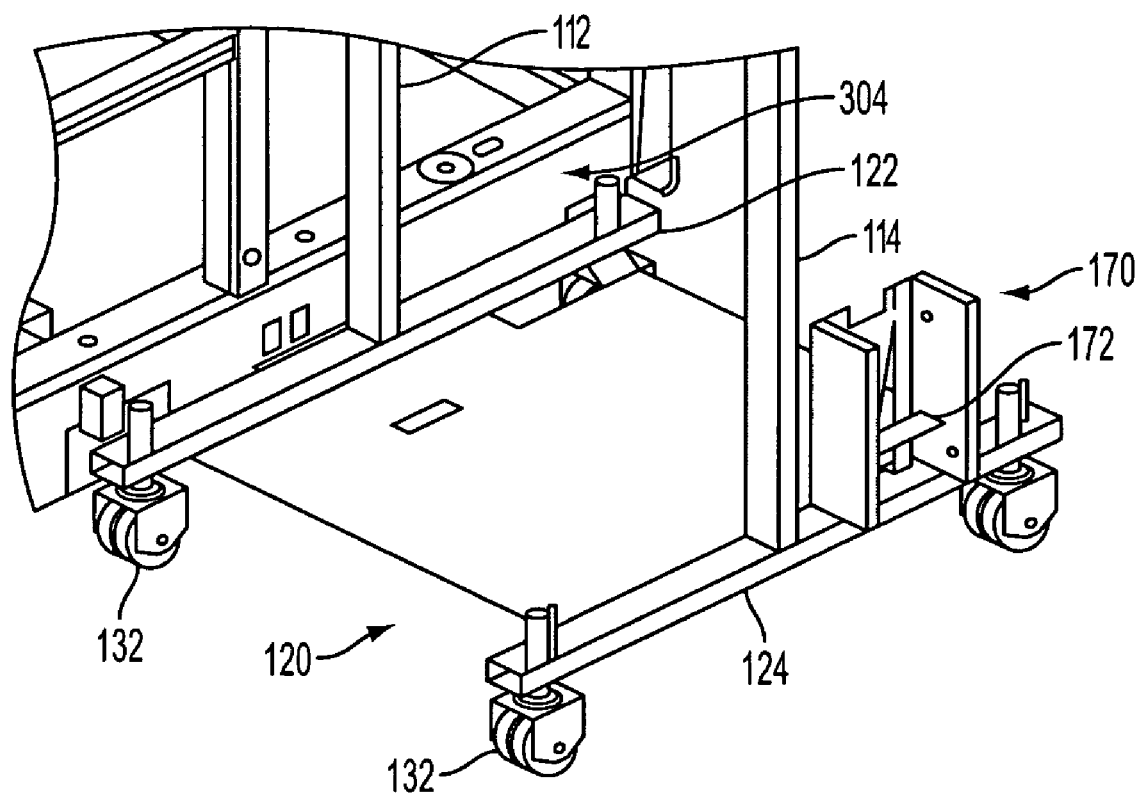
FIGS. 10 and 11 show views of the cart and the X-tower in the docking mode.

FIG. 10 shows an isometric view of the base platform 120 and the tower base 304 in the docking mode with the fore side of the cart 100 disposed adjacent the X-tower 300. A lever assembly 170 may be disposed on the aft side of the cart 100, as shown. The lever assembly 170 may include a foot pedal 172 connected to the tongue 164 by a hinge (not shown) under the base platform 120. In response to downward force applied to the foot pedal 172, the tongue 164 elevates in seesaw fashion to raise the insert 162.

Figure 11:
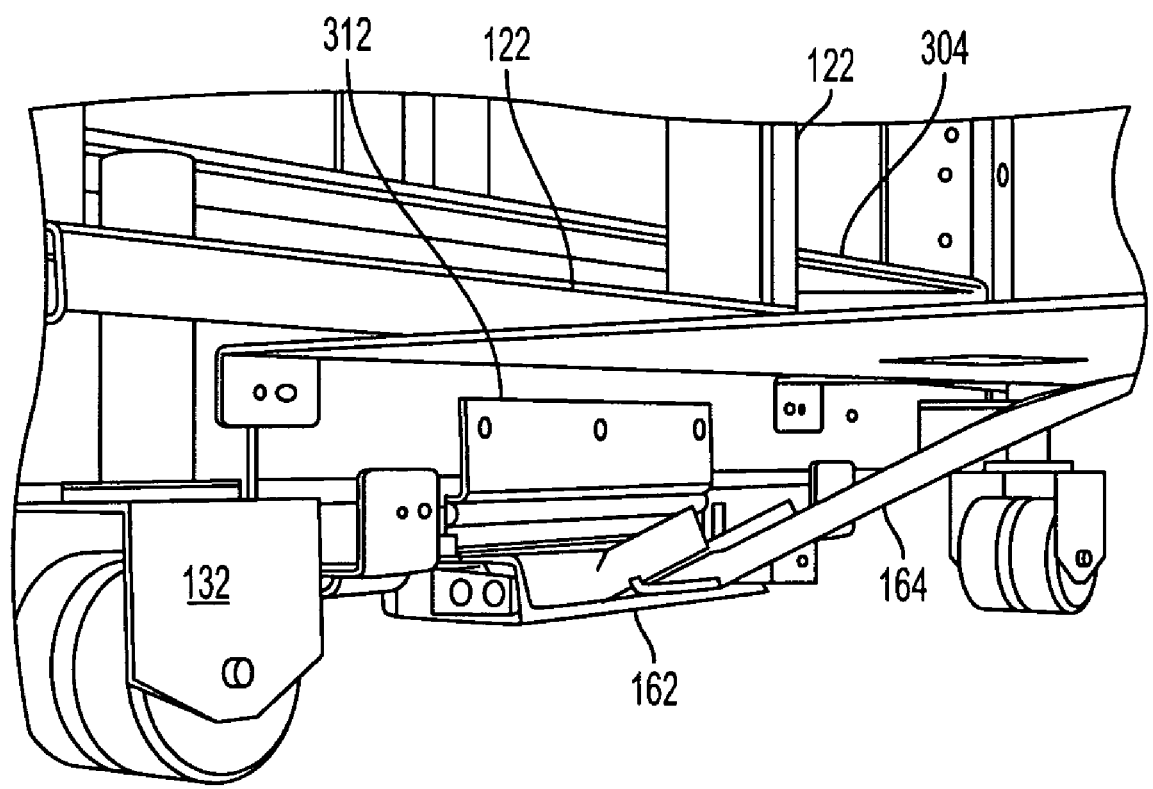

FIG. 11 shows a perspective view of the fore side of the base platform 120. After sliding the insert 162 underneath the mounting plate 312, the foot pedal 172 may be depressed to raise the tongue 164, thereby securing the insert 162 to connect with the mounting plate 312. Release of the docking latch 160 from the docking port 310 may be accomplished by raising the foot pedal 172 and sliding the cart 100 away from the X-tower 300.

Those of ordinary skill will recognize that description of the docking latch 160 and the lever assembly 170 on fore and aft sides of the cart 100, respectively, represents only a simplified example for descriptive purposes to reduce visual clutter. Various exemplary embodiments include disposing docking latches 160 and lever assemblies 170 on both fore and aft sides of the cart 100 to facilitate retrieval and mounting of a CCU 200 from either side.

Exchanging the retrieved CCU 204 with the replacement CCU 202 may be performed by docking the cart 100 against the X-tower 300 aligned to dispose the aft handle bar 118 on the aft vertical member 114 adjacent to the front side tower frame 302. An operator conducting the transfer raises the reverse platform 154 to align its guide rail 158 with a mounting rail of the X-tower 300 on which the retrieved CCU 204 may have been installed. These mounting rails may optionally be docked or otherwise disconnectably secured in position.

The operator may slide the retrieved CCU 204 along the guide rail 158 onto the reverse platform 154. The docking latch 160 and casters 132 may be released in order to turn the cart 100 about its vertical axis 105 on the floor. The operator may lift the replacement CCU 202 onto the obverse platform 152.

Subsequently, the operator may dock the cart 100 against the X-tower 300 aligned to dispose the fore handle bar 116 on the fore vertical member 112 adjacent to the front side tower frame 302 and thereby align the mounting rail 158 to the mounting rail of the X-tower 300. The operator may pull the reverse platform 154 downward to lower the retrieved CCU 204, with the counterweight of the replacement CCU 202 compensating for the required force.

The inertial and frictional force required to initiate movement of the platforms 150 may be, for example, greater than ~8 pounds-force. As the reverse platform 154 is lowered, the obverse platform 152 is raised, elevating the replacement CCU 202. After being lowered, the retrieved CCU 204 may be removed from the reverse platform 154 for storage.

The operator may provide the required translation force manually, with a lockout safety mechanism to avoid uncontrollable acceleration and excess movement speed of the platforms 150 ascending and/or descending. Alternatively, a mechanical, pneumatic and/or hydraulic spring may provide supplemental force, or else, a motor may be used to provide the entire transfer force. When the obverse platform 152 reaches the mounting height of 63 inches and aligns the guide rail 158 with the mounting rail, the operator can then slide the replacement CCU 202 from the cart 100 for installing into the X-tower 300.

The CCU sliding operation to and from the guide rail 158 may be performed manually, or alternatively by a motor that supplies the motive transfer force. After installing the replacement CCU 202, the cart 100 may be undocked from the X-tower 300 and relocated. Artisans of ordinary skill will recognize that these procedures need not be performed in the precise sequence as presented, and that alternate and supplemental procedures may accompany the described arrangements without departing from the scope of the inventive embodiments described herein.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A transportable device for transporting and elevating an imaging media cartridge into a press printer, comprising:
   a base platform;
   an elevation member disposed on the base platform having a pair of opposite vertical faces; and
   first and second elevator platforms each disposed along one of the pair of opposite vertical faces, the elevator platforms being vertically slidable along the faces,
   wherein the first elevator platform receives a first imaging media cartridge at a first elevation, the second elevator platform receives a second imaging media cartridge at a second elevation, and the first and second elevator platforms mutually exchange elevations by sliding vertically in opposite directions.

2. The transportable device according to claim 1, wherein the elevation member includes first and second elevation members disposed on opposing sides of the base platform.

3. The transportable device according to claim 2, further comprising:
   a panel disposed between the first and second elevation members, the panel having a pair of opposite vertical faces, wherein the first and second elevator platforms are each disposed along one of the pair of opposite vertical faces, the elevator platforms being vertically slidable along the faces.

4. The transportable device according to claim 2, further comprising:
   a reinforcement frame between the base platform and the first and second elevation members.

5. The transportable device according to claim 3, wherein the panel further includes at least one vertical slot through which at least one elevator platform extends and along which the at least one of the elevator platform slides.

6. The transportable device according to claim 1, further comprising:
   a docking mechanism with which to securely and detachably connect the base platform to the press printer.

7. The transportable device according to claim 1, further comprising:
   a pulley that connects to and counterbalances the first and second elevator platforms.

8. The transportable device according to claim 3, further comprising:
   a pulley that connects to and counterbalances the first and second elevator platforms, the pulley being supported from the panel.

9. The transportable device according to claim 1, wherein at least one of the first and second elevator platforms further includes a horizontal rail for installing the imaging media cartridge into the press printer.

10. The transportable device according to claim 1, further comprising:
    caster wheels disposed on the base platform with which to translate and rotate the transportable device along a floor surface.

11. The transportable device according to claim 1, further comprising:
    a plurality of racks for storing imaging media cartridges.

12. The transportable device according to claim 1, wherein
    the first elevation corresponds to an installation height of the imaging media cartridge in the press printer from one of the first and second elevator platforms, and
    the second elevation corresponds to an ergonomically acceptable height to manually load the imaging media cartridge onto the other of the first and second elevator platforms.

* * * * *